(12) United States Patent
Liu et al.

(10) Patent No.: US 11,495,134 B2
(45) Date of Patent: Nov. 8, 2022

(54) SYSTEM AND METHOD FOR DATABASE AUGMENTED GROUND COLLISION AVOIDANCE

(71) Applicant: HONEYWELL INTERNATIONAL INC., Morris Plains, NJ (US)

(72) Inventors: Yufeng Liu, Beijing (CN); Yong Zhang, Beijing (CN); Gang He, Morristown, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 221 days.

(21) Appl. No.: 16/872,128

(22) Filed: May 11, 2020

(65) Prior Publication Data

US 2021/0350715 A1 Nov. 11, 2021

(51) Int. Cl.
*G08G 5/04* (2006.01)
*G08G 5/00* (2006.01)
*G01S 13/934* (2020.01)
*G01S 15/93* (2020.01)

(52) U.S. Cl.
CPC ........... *G08G 5/045* (2013.01); *G08G 5/0021* (2013.01)

(58) Field of Classification Search
CPC .............................. G08G 5/045; G08G 5/0021
See application file for complete search history.

(56) References Cited

U.S. PATENT DOCUMENTS

| | | | |
|---|---|---|---|
| 5,519,618 A * | 5/1996 | Kastner | G08G 5/065 701/120 |
| 5,884,223 A | 3/1999 | Tognazzini | |
| 8,019,529 B1 | 9/2011 | Sharma et al. | |
| 2003/0004641 A1* | 1/2003 | Corwin | G08G 5/045 342/29 |
| 2008/0109163 A1* | 5/2008 | Stone | G08G 5/065 301/16 |
| 2009/0018713 A1 | 1/2009 | Coulmeau et al. | |
| 2010/0256909 A1 | 10/2010 | Duggan et al. | |
| 2011/0071750 A1 | 3/2011 | Giovino et al. | |

(Continued)

FOREIGN PATENT DOCUMENTS

| | | |
|---|---|---|
| EP | 3200171 A1 | 8/2017 |
| EP | 3471078 A1 | 4/2019 |
| EP | 3486888 A1 | 5/2019 |

*Primary Examiner* — Frederick M Brushaber
*Assistant Examiner* — Elizabeth Yang
(74) *Attorney, Agent, or Firm* — Lorenz & Kopf, LLP

(57) ABSTRACT

A ground collision avoidance method in an ownship vehicle is disclosed. The method includes: retrieving position measurements for the ownship vehicle and for a dynamic obstacle; retrieving mapping data from an airport map database that includes coordinate data for airport travel pathways; adjusting a position measurement for the ownship vehicle and a position measurement for the dynamic obstacle based on coordinate data retrieved from the airport map database and historical aircraft movement data; predicting a series of future positions for the ownship vehicle that are constrained by airport surface operation rules; predicting a series of future positions for the dynamic obstacle that are constrained by airport surface operation rules; calculating whether a potential collision is imminent; and causing a collision alert to be displayed when the processor has determined that a potential collision between the ownship vehicle and the dynamic obstacle is imminent.

20 Claims, 8 Drawing Sheets

(56) References Cited

U.S. PATENT DOCUMENTS

| | | | |
|---|---|---|---|
| 2013/0096814 A1* | 4/2013 | Louis | G08G 5/06 |
| | | | 701/301 |
| 2013/0345906 A1 | 12/2013 | Kabrt et al. | |
| 2014/0249739 A1* | 9/2014 | Lafon | G08G 5/065 |
| | | | 701/301 |
| 2014/0303815 A1* | 10/2014 | Lafon | G08G 5/0021 |
| | | | 701/3 |
| 2016/0163208 A1* | 6/2016 | Zhou | G06V 20/58 |
| | | | 701/301 |

* cited by examiner

SYSTEM AND METHOD FOR DATABASE AUGMENTED GROUND COLLISION AVOIDANCE

TECHNICAL FIELD

Embodiments of the subject matter described herein relate generally to collision avoidance systems. More particularly, embodiments of the subject matter relate to ground-based collision avoidance systems for vehicles.

BACKGROUND

It can be very difficult for a pilot to see the wingtips of its aircraft while taxiing the aircraft on an airport surface and judge the clearance between its aircraft and obstructions such as buildings, other aircraft, ground vehicles, and poles etc. Collisions with such obstructions have occurred every year for many years and the frequency of collisions have increased with air traffic growth. Aircraft collisions with any obstruction can not only damage the aircraft, but can also put the aircraft out of service, and may impact an airlines' reputation.

Because taxiways at an airport are not always straight, may contain many curved sections and may intersect other taxiways, attempting to predict a collision risk based solely on heading and ground speed of two aircraft can cause nuisance alerts. For example, if the two aircraft are traveling on different taxiways that do not intersect each other, there is not a real risk of collision even though at times the two aircraft may appear to be approaching the travel path of the other aircraft due to the curvy nature of the taxiways. If a collision avoidance system were to generate too many nuisance alerts, pilots may pay less attention to collision alerts and may even ignore them. In such a case, a pilot may inadvertently ignore a true collision alert resulting in an avoidable collision.

Hence, it is desirable to provide a ground collision avoidance system with a low nuisance alert rate. Furthermore, other desirable features and characteristics of the present invention will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor-implemented ground collision avoidance method in an ownship vehicle is disclosed. The method includes: retrieving, from sensors on the ownship vehicle, position measurements for the ownship vehicle on the ground and for a dynamic obstacle on the ground; retrieving, by a processor on the ownship vehicle, mapping data from an airport map database that includes coordinate data for airport travel pathways and coordinate data and dimension data for a static obstruction (e.g., building, pole, etc.) on an airport surface; adjusting, by the processor, a position measurement for the ownship vehicle to a current ownship vehicle position based on coordinate data retrieved from the airport map database and historical aircraft movement data; adjusting, by the processor, a position measurement for the dynamic obstacle to a current dynamic obstacle position based on coordinate data retrieved from the airport map database and historical aircraft movement data; predicting, by the processor, a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data; predicting, by the processor, a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data; calculating, by the processor, whether a potential collision is imminent by estimating whether the predicted series of future positions for the ownship vehicle will intersect with the predicted series of future positions for the dynamic obstacle; calculating, by the processor, whether a potential collision is imminent by estimating whether the predicted series of future positions for the ownship vehicle will intersect with the boundary of a static obstruction; and causing, by the processor, a collision alert to be displayed on a display device when the processor has determined that a potential collision between the ownship vehicle and the dynamic obstacle or static obstacle is imminent.

In another embodiment, a ground collision avoidance system in an ownship vehicle is disclosed. The system includes a controller configured by programming instructions encoded on non-transitory computer readable media. The controller is configured to: retrieve, from sensors on the ownship vehicle, position measurements for the ownship vehicle on the ground and for a dynamic obstacle on the ground; retrieve mapping data from an airport map database that includes coordinate data for airport travel pathways and coordinate data and dimension data for a static obstruction (e.g., building, pole, etc.) on an airport surface; adjust a position measurement for the ownship vehicle to a current ownship vehicle position based on coordinate data retrieved from the airport map database and historical aircraft movement data; adjust a position measurement for the dynamic obstacle to a current dynamic obstacle position based on coordinate data retrieved from the airport map database and historical aircraft movement data; predict a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data; predict a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data; calculate whether a potential collision is imminent by estimating whether the predicted series of future positions for the ownship vehicle will intersect with the predicted series of future positions for the dynamic obstacle; calculate whether a potential collision is imminent by estimating whether the predicted series of future positions for the ownship vehicle will intersect with the boundary of a static obstruction; and cause a collision alert to be displayed on a display device when the processor has determined that a potential collision between the ownship vehicle and the dynamic obstacle or static obstacle is imminent.

In another embodiment, non-transitory computer readable media encoded with programming instructions configurable to cause a processor to perform a method is disclosed. The method includes: retrieving, from sensors on the ownship vehicle, position measurements for the ownship vehicle on the ground and for a dynamic obstacle on the ground; retrieving, by a processor on the ownship vehicle, mapping data from an airport map database that includes coordinate data for airport travel pathways and coordinate data and dimension data for a static obstruction (e.g., building, pole, etc.) on an airport surface; adjusting, by the processor, a position measurement for the ownship vehicle to a current ownship vehicle position based on coordinate data retrieved from the airport map database and historical aircraft movement data; adjusting, by the processor, a position measurement for the dynamic obstacle to a current dynamic obstacle position based on coordinate data retrieved from the airport map database and historical aircraft movement data; predicting, by the processor, a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data; predicting, by the processor, a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data; calculating, by the processor, whether a potential collision is imminent by estimating whether the predicted series of future positions for the ownship vehicle will intersect with the predicted series of future positions for the dynamic obstacle; calculating, by the processor, whether a potential collision is imminent by estimating whether the predicted series of future positions for the ownship vehicle will intersect with the boundary of a static obstruction; and causing, by the processor, a collision alert to be displayed on a display device when the processor has determined that a potential collision between the ownship vehicle and the dynamic obstacle or static obstacle is imminent.

In another embodiment, a processor-implemented collision avoidance method in an ownship vehicle is disclosed. The method includes: detecting, by sensors on the ownship vehicle, position information for the ownship vehicle including latitude, longitude, altitude, ground speed and heading; detecting, by sensors on the ownship vehicle, any dynamic obstacle including a ground vehicle or other aircraft, and any fixed obstacle including a building or poles in, near, or approaching the path of the ownship vehicle and the position, size, ground speed and heading of any dynamic obstacle; retrieving, by a processor on the ownship vehicle, mapping data from an airport moving map database which includes coordinates of airport elements that includes runways, taxiways, and terminal buildings; determining, by the processor, position and other maneuver information for the ownship vehicle including ground speed and heading information; determining, by the processor, surrounding objects information for a detected dynamic obstacle including position, velocity, heading, and size of the detected dynamic obstacle; correcting, by the processor, using the mapping data from the airport moving map database and/or historical mapping data derived from a statistical model, the position and/or path of the ownship vehicle and/or detected obstructions; calculating, by the processor, based on the corrected position and/or path, a potential collision risk between the ownship vehicle and detected obstructions, including using the mapping data from the airport moving map database and/or historical mapping data derived from the statistical model to filter out a nuisance alert of a potential collision that cannot occur because of travel path constraints imposed by runways, taxiways, and/or other airport surface operation rules on the ownship vehicle and/or detected obstructions; causing, by the processor, symbols that represent the ownship vehicle and the detected obstructions to be displayed on a display device along with associated position, ground speed, and heading for the objects; and causing, by the processor, a collision alert to be displayed on the display device when a potential collision risk between the ownship vehicle and a detected obstruction is imminent.

Furthermore, other desirable features and characteristics will become apparent from the subsequent detailed description and the appended claims, taken in conjunction with the accompanying drawings and the preceding background.

BRIEF DESCRIPTION OF THE DRAWINGS

Embodiments of the subject matter will hereinafter be described in conjunction with the following drawing figures, wherein like numerals denote like elements, and wherein.

DETAILED DESCRIPTION

Figure 1:
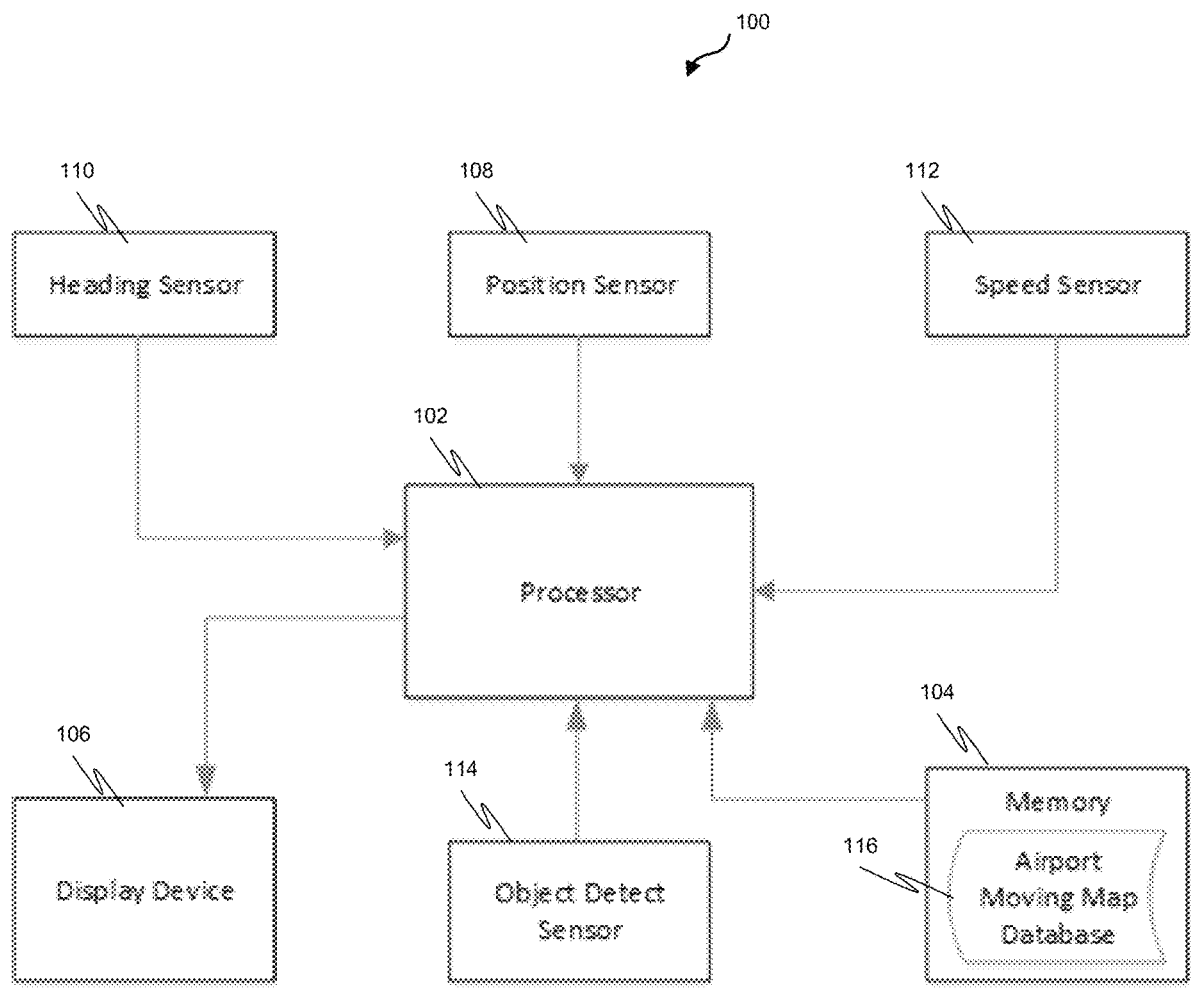
FIG. 1 is a block diagram depicting an example aircraft ground collision avoidance system on an aircraft, in accordance with some embodiments.

The following detailed description is merely exemplary in nature and is not intended to limit the application and uses. Furthermore, there is no intention to be bound by any expressed or implied theory presented in the preceding technical field, background, summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The subject matter described herein discloses apparatus, systems, techniques and articles for an aircraft ground collision avoidance system. The apparatus, systems, techniques and articles provided herein can make use of an airport moving map database to correct aircraft and object position and/or path for predicting possible alert situations. The apparatus, systems, techniques and articles provided herein can make use of an airport moving map database to identify a potential nuisance alert event based on surface operation rules and airport geometry, so that, for example, two aircraft moving on two independent taxiways do not lead to an alert condition.

FIG. 1 is a block diagram depicting an example aircraft ground collision avoidance system 100 on an aircraft. The aircraft ground collision avoidance system 100 comprises a controller, which includes at least one processor 102 and computer readable media 104, and a display device 106. The controller is configured by programming instructions encoded on the computer readable media 104 to predict the movement of the ownship aircraft on the ground at an airport or other aerodrome, determine the position of potential obstacles (e.g., dynamic obstacles and fixed position obstacles) on the ground at the aerodrome, and predict the movement of dynamic obstacles (e.g., other aircraft or ground vehicles) on the ground at the aerodrome. Based on the predicted movement of the ownship aircraft, the predicted movement of moveable obstacles, and the position of fixed obstacles (e.g., building), the controller is configured to predict a collision risk for the ownship aircraft with an obstacle and provide a collision risk warning via the display device 106 for consumption by the flight crew if substantial risk of collision is predicted.

The processor 102 may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The computer readable storage device or media 104 may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media 104 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller and some of which to store an airport moving map database 116 and other predefined constant parameters used by the controller to predict a collision risk for the ownship aircraft with an obstacle. The airport moving map database may include coordinates of airport elements such as runways, taxiways, terminal buildings, and more.

The example aircraft ground collision avoidance system 100 further includes one or more position sensors 108, heading sensors 110, speed sensors 112, and object detect sensors 114. The position sensors 108 can be used to measure ownship aircraft position information such as latitude, longitude and altitude. The position sensors 108 may be implemented using aircraft systems such as a GPS (Global Positioning System) and/or an IRS (Inertial Reference System).

The heading sensors 110 can be used to measure the heading of the ownship aircraft while traveling on the ground. The heading sensors 110 may be implemented using aircraft systems such as a GPS, an IRS, an AHRS (attitude and heading reference system), and/or magnetometer.

The speed sensors 112 can be used to measure the ground speed of the ownship aircraft. The speed sensors 112 may be implemented using aircraft systems such as a GPS, an IRS, and/or an ADS (air data system).

The object detect sensors 114 can be used to detect potential obstructions in the projected path of the ownship aircraft and to measure information useful for characterizing the potential obstructions such as position, heading, ground speed, size, etc. The object detect sensors 114 are configured to detect both dynamic obstructions (e.g., ground vehicle or other aircraft) and fixed obstacles (e.g., buildings, poles, etc.) The object detect sensors 114 may be implemented using aircraft systems such as ADS-B (Automatic Dependent Surveillance Broadcast), radar, and others.

The controller is configured to predict the movement of the ownship aircraft using position and other maneuver information such as ground speed and heading information from the position sensors 108, heading sensors 110, and speed sensors 112. The controller is configured to correct the predicted position and path of the ownship aircraft using airport moving map data from the airport moving map database 116, which includes coordinates of airport elements such as runways and taxiways. The controller is configured to determine whether the ownship aircraft is traveling on an airport element (e.g., runway or taxiway) and predict the movement of the ownship aircraft based on the allowed travel path of the airport element (e.g., runway or taxiway).

The controller is configured to predict the movement of dynamic obstacles using information such as location, velocity, heading, size, etc. from the object detect sensors 114. The controller is configured to correct the predicted position and path of dynamic obstacles using airport moving map data from the airport moving map database 116. The controller is configured to determine whether a dynamic obstacle is traveling on an airport element (e.g., runway or taxiway) and predict the movement of the dynamic obstacle based on the allowed travel path of the airport element (e.g., runway or taxiway).

Based on the predicted movement of the ownship aircraft, the predicted movement of dynamic obstacles, and the position of fixed obstacles (e.g., building), the controller is configured to predict a potential collision risk for the ownship aircraft with surrounding obstacles and provide a collision risk warning via the display device 106 for consumption by the flight crew if substantial risk of collision is predicted.

The controller, using data from the airport moving map database, is configured to filter and reduce nuisance alerts of potential collisions, which cannot occurred due to surface operation rules. For example, consideration of current heading and velocity for the ownship aircraft and another aircraft could result in a nuisance alert of a potential collision between the two aircraft, but consideration of data from the airport moving map database may indicate that the two aircrafts are moving on separate taxiways and collision is therefore unlikely.

The controller is configured to calculate a collision risk using an aircraft protection zone around the ownship aircraft and an obstacle aircraft. The aircraft protection zone takes into account the aircraft size and a position error. The position error is estimated, by the controller, based on statistics from historical position data, which makes the aircraft protection zone more realistic and helps to reduce the occurrence of both a nuisance alert and a missed alert.

The controller is configured to configured to cause to be displayed on the display device 106 symbols to represent the ownship aircraft with its protection zone and surrounding objects with a protection zone if appropriate. The symbols may also indicate the location, ground speed, heading, etc., for the ownship aircraft and the surrounding objects. Also display device will output alert when the potential collision risk is imminent.

The display device 106 can display an airport map, which includes runways, taxiways, terminal buildings, etc., and overlay, on the airport map, a symbol for the ownship aircraft and a symbol for a detected object. The controller is configured to cause a collision risk warning to be displayed on the display device 106 when there is potential collision risk.

Figure 2:
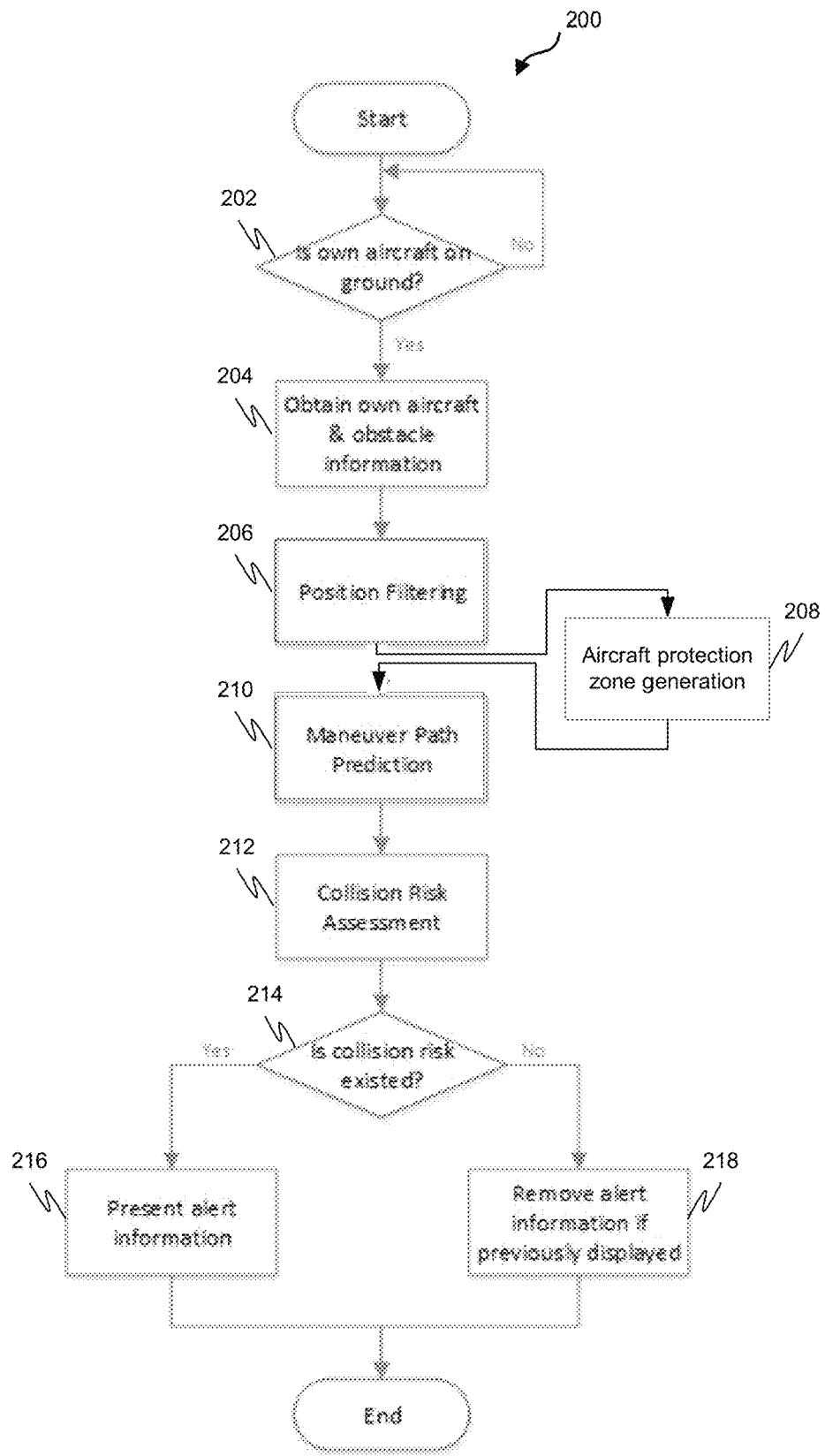
FIG. 2 is a process flow chart depicting an example processor-implemented process to assess whether there is potential collision risk between an ownship aircraft and surrounding obstacles while the aircraft is traveling on a ground path on the ground at an airport or other aerodrome, in accordance with some embodiments.

FIG. 2 is a process flow chart depicting an example processor-implemented process 200 to assess whether there is potential collision risk between an ownship aircraft and surrounding obstacles while the aircraft is traveling on a ground path on the ground at an airport or other aerodrome. The example process 200 includes determining whether the ownship aircraft is on the ground (decision 202). The processor can use onboard avionics parameters such as WOW (Weight on Wheel), airspeed and/or altitude, etc. to determine whether the ownship aircraft is on the ground or in the air. For example, when the WOW state is true, the aircraft airspeed is below a configurable threshold (e.g., 80 knots), and the current altitude is the same as or close to the airport elevation, the processor can determine that the own aircraft is on the ground. When the processor determines that the ownship aircraft is on the ground (yes at decision 202), the process 200 proceeds with determining whether obstacles exist within the ground path of the ownship. Otherwise (no at decision 202), the process 200 does not continue until it is determined that the ownship aircraft is on the ground.

The example process 200 includes obtaining ownship aircraft and obstacle information (operation 204) for use in determining the position of the ownship aircraft and obstacles, the ground path of the ownship aircraft, and the potential ground path of dynamic obstacles (e.g., obstacles such as other aircraft, ground vehicles, and others) that are moving in the vicinity of the ownship. The processor can obtain ownship aircraft and obstacle information from sensors onboard the ownship aircraft. The information can include the latitude, longitude, altitude, ground speed, heading and dimension, among others, for both the ownship and potential obstacles. The potential obstacles may include dynamic obstacles such as other aircraft and ground vehicles, and also static obstacles such as a terminal building, pole, etc. The obstacle information may be obtained by active or passive sensors onboard the ownship such as radar, Lidar, camera, ultrasound sensor and ADS-B receiver, among others. For static obstacles, the information may also be obtained from an airport database.

The example process 200 includes position filtering (operation 206). Position filtering involves adjusting the position measurements for the ownship and dynamic obstacles obtained from onboard sensors to corrected position locations based on position data retrieved from an airport map database and historical aircraft movement data.

A guidance line, for an aircraft to follow when the aircraft is moving, is typically painted on the surface of taxiways and in the ramp areas at airports. Typically, pilots are trained to maintain the aircraft main gear on the guidance line as closely as possible while the aircraft moves on the airport surface.

Position measurements obtained from position sensors onboard an ownship aircraft may provide a position that deviates away from a taxiway guidance line even when an aircraft actually taxis along the taxiway guidance line. This may occur because the position sensors themselves have a measurement error, especially widely used GPS sensors, which suffer from multipath interference when used on the ground. Consequently, the processor is configured to correct the measured aircraft position to the guidance line through position filtering.

Figure 3:
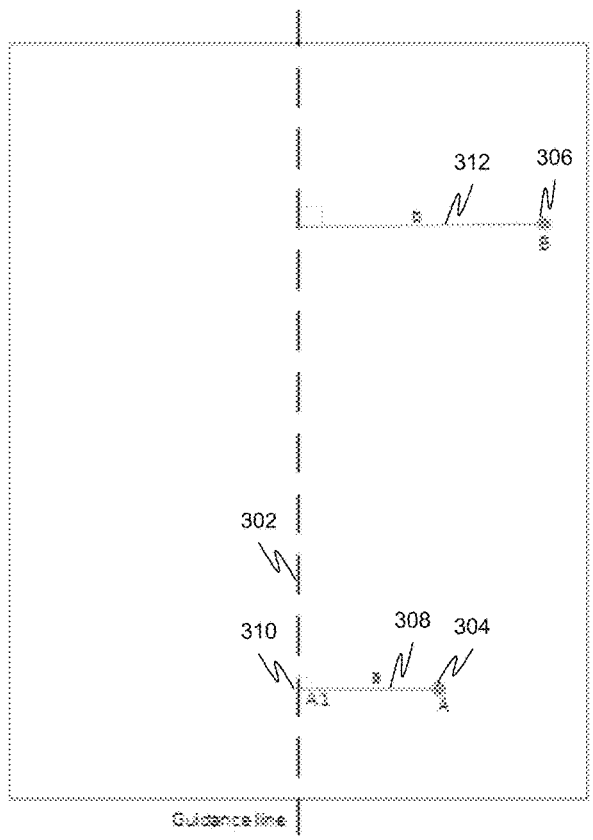
FIG. 3 is a diagram illustrated a method for correcting a measured aircraft position to the nearest point on the guidance line, in accordance with some embodiments.

The airport moving map database includes coordinate information for key elements at the airport, such as runways, taxiways, guidance lines, terminals, aprons, etc. The processor is configured to obtain the measured aircraft position and then find the nearest point on the guidance line to the measured aircraft position based on coordinate information from the airport database. If the perpendicular distance from the measured aircraft position to the nearest guidance line is less than a configurable threshold distance, the measured aircraft position will be corrected, by the processor, to the nearest point on the guidance line. This is illustrated in FIG. 3, which is a diagram that depicts an example guidance line (302), a measured aircraft position A (304), and a measured aircraft position B (306). Because the perpendicular distance a (308) from measured aircraft position A (304) to the nearest point A1 (310) on the guidance line (302) is less than a threshold distance, then the measured position is corrected to point A1 (310) on the guidance line (302). When the distance b (312) from the measured aircraft position B (306) to the nearest point on the guidance line 302 is greater than the threshold, the measured position B (306) is considered as intentionally there and is not corrected to a point on the guidance line.

Figure 4:
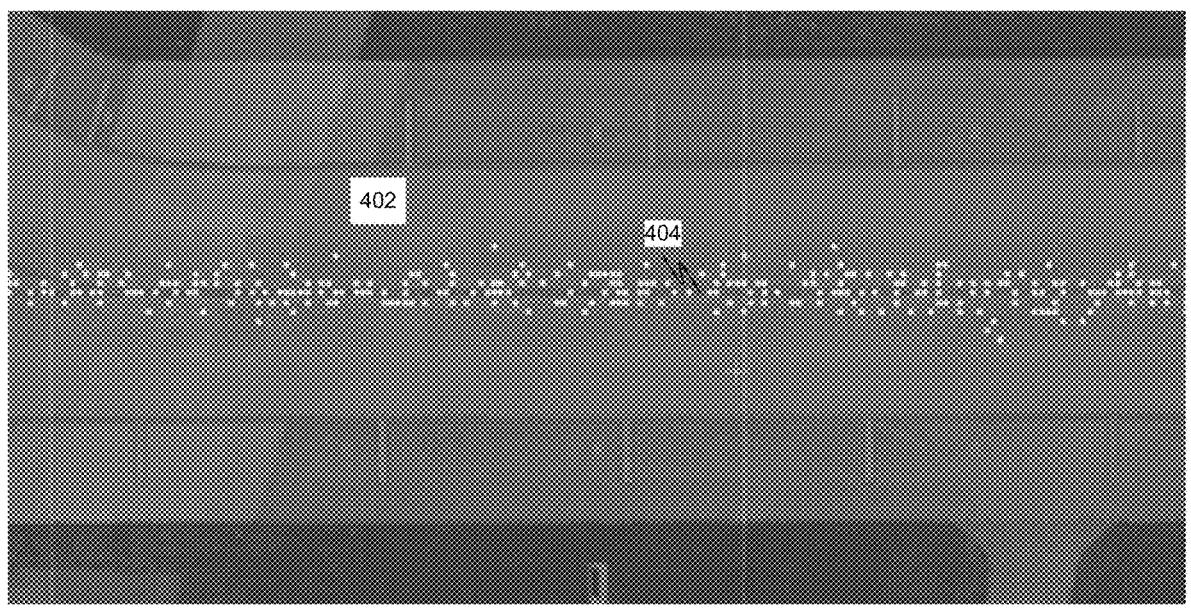
FIG. 4 is a diagram depicting a set of example historical aircraft taxi operation data, in accordance with some embodiments.

The threshold value in the position filtering operation (operation 206) can be determined based on statistics relating to historical aircraft taxi operation data. FIG. 4 is a diagram depicting a set of example historical aircraft taxi operation data. Each dot represents one measured aircraft position on a taxiway 402 when aircraft taxi along a guidance line 404 on the taxiway 402. By measuring the distance from each measured position to the closest point on the guidance line 404 and analyzing large amounts of the measured distance data, the threshold value can be determined based on a selected confidence level (e.g., 95%). The threshold value, however, may be different in different areas of the airport due to variant interference level. For example, the threshold value may be 3 meters on a taxiway and may be 6.5 meters in a ramp area.

In summary, the threshold value can be determined based on statistics relating to historical taxi operation data on an airport surface. The threshold value is configurable for different airport surfaces, and a processor can select to use a corresponding threshold value based on a measured aircraft position. For example, when an aircraft is on a taxiway, the processor can select a smaller threshold value (e.g., 3 meters), and when the aircraft is in a ramp area, the processor can select a different value (e.g. 6.5 meters).

Figure 5:
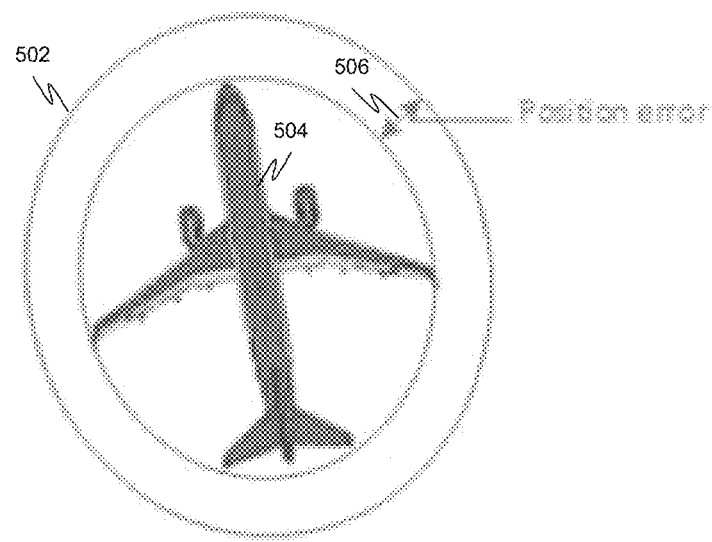
FIG. 5 is a diagram illustrating an example protection zone around an example aircraft, in accordance with some embodiments.

Referring back to FIG. 2, the example process 200 includes generating an aircraft protection zone around the corrected position (through position filtering) of the ownship aircraft and the corrected position (through position filtering) of an obstacle aircraft (operation 208). An aircraft protection zone can have an elliptical shape with its center point at the corrected position. As illustrated in the FIG. 3, the corrected position is at point A1 (310). FIG. 5 is a diagram illustrating an example protection zone 502 around an example aircraft 504. The example protection zone 502 around the example aircraft 504 has an elliptical shape. The longitudinal axis of the ellipse is set to cover the aircraft length plus a position error 506. The lateral axis of the ellipse is set to cover the aircraft wingspan plus the position error 506. The position error 506 can be set to be the same value as the threshold value discussed above with regard to position filtering.

A look up table may be stored in memory onboard the ownship aircraft for the processor to use to obtain aircraft length and wingspan information, as illustrated in the Table 1 below.

TABLE 1

Aircraft Look Up Table

| Aircraft Type | Type Code | WingSpan (m) | Length (m) |
|---|---|---|---|
| A300-600 | A306 | 44.84 | 54.08 |
| A300 | A30B | 44.83 | 53.61 |
| A310 | A310 | 43.9 | 46.66 |
| A318 | A318 | 34.10 | 31.44 |
| A319 | A319 | 35.8 | 33.84 |
| A320 | A320 | 35.8 | 37.57 |
| A321 | A321 | 35.8 | 44.51 |
| ... | ... | ... | ... |

For an ownship aircraft, the processor can directly find the aircraft size based on the ownship aircraft type. For traffic aircraft, a look up table is implemented to associate Mode S ID to Aircraft Type as illustrated in the Table 2. Because an object detection sensor, such as an ADS-B sensor, always outputs the Mode S ID for traffic aircraft, the processor can decode the Mode S ID from the ADS-B message, then use the Mode S ID to find the corresponding aircraft type as per Table 2, and finally use the aircraft type with Aircraft Look Up Table 1 to identify the corresponding length and wingspan. If the processor could not find the aircraft type for a Mode S ID, the processor will decode traffic aircraft size including both length and wingspan. But the length and wingspan information is not always received from an ADS-B sensor since these two parameters are optional and often are not transmitted in an ADS-B message.

TABLE 2

Mode S ID Associate to Aircraft Type

| Mode S ID | Aircraft Type |
|---|---|
| ID_1 | Type A |
| ID_2 | Type B |
| ID_3 | Type A |
| ... | ... |
| ID_n | Type E |

When the object detection sensor does not provide length and wingspan information for traffic aircraft and when the Mode S ID is not obtained from the object detection sensor, the traffic aircraft size may be estimated by tracking the path of the traffic aircraft.

According to the ICAO document, each taxiway is designed to a different category, and each category has the minimum width for taxiway pavement area as shown in the Table 3 below. For example, the taxiway of category D has a minimum width of 23 meters.

TABLE 3

Design Criteria for Taxiway

| Physical characteristics | Code letter | | | | | |
|---|---|---|---|---|---|---|
| Minimum width of: | A | B | C | D | E | F |
| taxiway pavement | 7.5 m | 10.5 m | 16 m$^a$<br>15 m$^b$ | 23 m$^c$<br>18 m$^d$ | 23 m | 25 m |
| taxiway pavement and shoulder | — | — | 25 m | 38 m | 44 m | 60 m |
| taxiway strip | 32.5 m | 43 m | 52 m | 81 m | 95 m | 115 m |
| graded portion of taxiway strip | 22 m | 25 m | 25 m | 38 m | 44 m | 60 m |
| Minimum clearance distance of outer main wheel to taxiway edge | 1.5 m | 2.25 m | 4.5 m$^a$<br>3 m$^b$ | 4.5 m | 4.5 m | 4.5 m |

Each taxiway category has an associated wingspan range as shown in Table 4 below. For example, a Code D taxiway allows aircraft with wingspan less than 52 meters to taxi.

TABLE 3

Wingspan associated to Taxiway code

| Code element 1 | | Code element 2 | | |
|---|---|---|---|---|
| Code number | Aeroplane reference field length | Code letter | Wing span | Outer main gear wheel span$^a$ |
| 1 | Less than 800 m | A | Up to but not including 15 m | Up to but not including 4.5 m |
| 2 | 800 m up to but not including 1 200 m | B | 15 m up to but not including 24 m | 4.5 m up to but not including 6 m |
| 3 | 1 200 m up to but not including 1 800 m | C | 24 m up to but not including 36 m | 6 m up to but not including 9 m |
| 4 | 1 800 m and over | D | 36 m up to but not including 52 m | 9 m up to but not including 14 m |
| | | E | 52 m up to but not including 65 m | 9 m up to but not including 14 m |
| | | F | 65 m up to but not including 80 m | 14 m up to but not including 16 m |

$^a$Distance between the outside edges of the main gear wheels.

Figure 6:
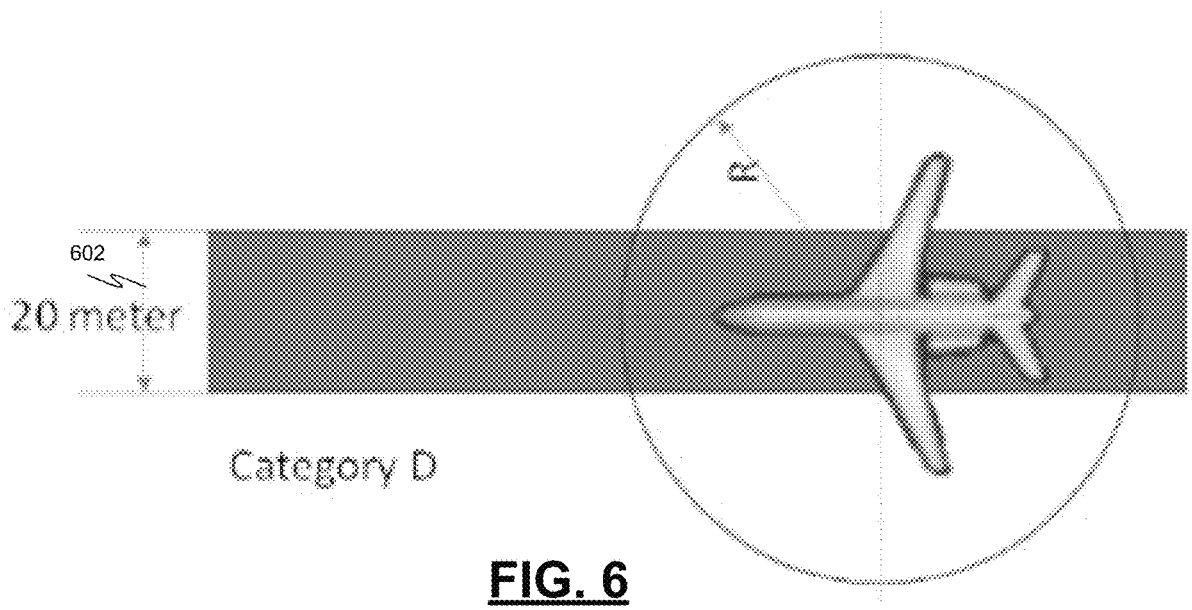
FIG. 6 is a diagram illustrating that a controller can leverage an airport database polygon area to calculate taxiway width, in accordance with some embodiments.

When the traffic aircraft size is not provided by an object detection sensor, the processor can track all the taxiways on which the specific traffic aircraft has passed, and the processor can leverage airport database polygon area to calculate taxiway width as illustrated in FIG. 6. The processor selects the minimum value from all calculated taxiway widths and checks against the taxiway design criteria Table 3 to find the taxiway category. For example, the minimum width 602 in all tracked taxiways is 20 meters as shown in FIG. 6, as per the taxiway design criteria Table 3, the taxiway should be in Code C (18<20<23). By checking Table 4, the maximum allowed wingspan is less than 36 meters. Thus, both the wingspan and length are estimated to be 36 meters for the specific traffic aircraft. In this case, even though the estimated aircraft size is not as accurate as the actual size, but compared with using the maximum wingspan, using the estimated aircraft size is helpful for reducing the size of the protection zone, which in turn can reduce the number of nuisance alerts.

Referring again to FIG. 2, the example process includes making maneuver path predictions for the aircraft protection zones for the ownship aircraft and the obstacle aircraft (operation 210). Maneuver path predictions involves predicting the next position of the aircraft protection zones for each of the ownship aircraft and the obstacle aircraft based on position measurements and position filtering.

Figure 7:
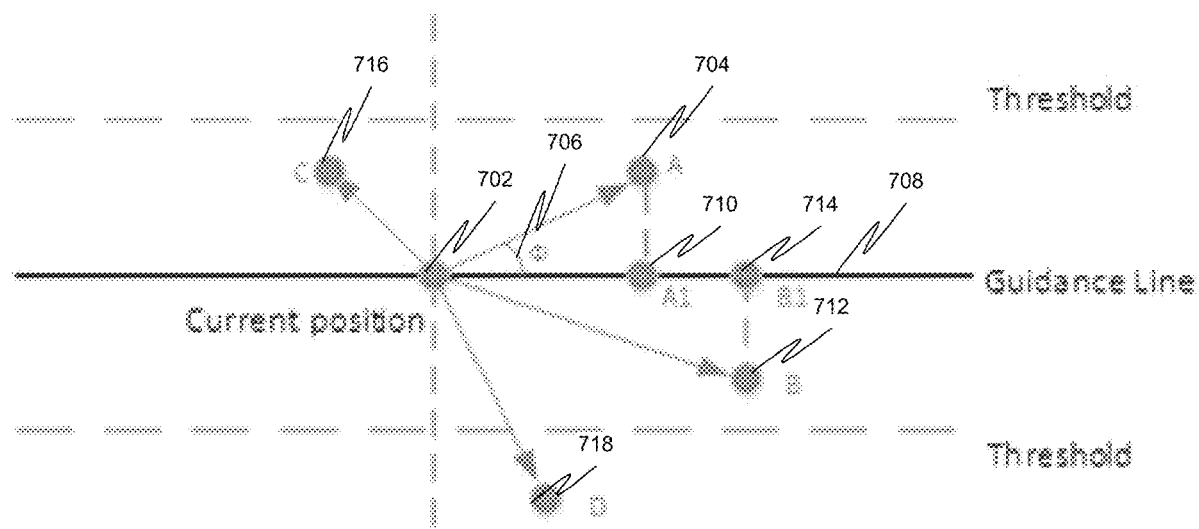
FIG. 7 is diagram that illustrates position filtering when projecting a measured position onto a guidance line while making maneuver path predictions, in accordance with some embodiments.

As discussed above with regard to position filtering, for each measured position, if the distance to the guidance line is less than the threshold value, the processor will project the measured position onto the guidance line. FIG. 7 is diagram that illustrates position filtering when projecting a measured position onto a guidance line while making maneuver path predictions. In this example, the current position point 702 is the projection location of a measured position after position filtering, point A (704) is the next consecutive measured position as the aircraft moves along a taxiway, and Φ (706) is the moving directional angle. When the distance to the guidance line (708) is less than the threshold level and Φ<=90 degrees, the next consecutive measured position will be projected onto the guidance line (708), for example, point A (704) would be projected to A1 (710), and point B (712) would be projected to B1 (714). The processor would treat the next projected position as the current position and continue to predict the aircraft position. When Φ>90 degrees, for example as with position C (716), position C (716) would be discarded since the aircraft could not move backward, and the processor would continue to use the current position (702) to predict the next position. When the distance to the guidance line (708) is greater than the threshold level, for example as with position D (718), the processor would not project the position onto the guidance line and instead use this position (position D (718)) as the current position to predict the next position.

Figure 8:
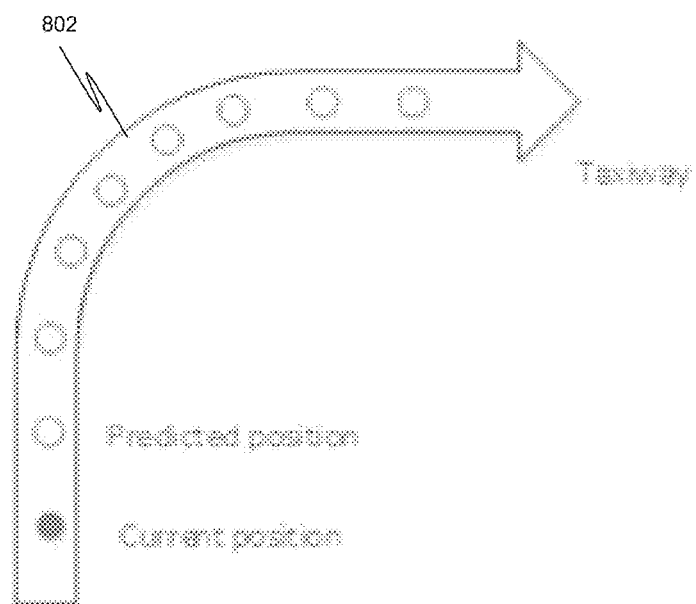
FIG. 8 is diagram that illustrates a curved section of a taxiway, in accordance with some embodiments.

FIG. 8 is diagram that illustrates a curved section of a taxiway 802. When the taxiway 802 is curved, the processor will predict the aircraft position by projecting a measured position onto the guidance line using the taxiway direction instead of using the current aircraft heading direction.

Referring back to FIG. 2, the example process 200 includes performing a collision risk assessment (operation 212). Collision risk assessment involves predicting future positions of the ownship aircraft and the obstacle aircraft and determining whether the predicted future positions of the ownship aircraft and obstacle aircraft overlap in the future. Predicting future positions for the ownship aircraft involves predicting future positions for up to a pre-determined look-ahead prediction distance. Predicting future positions for the obstacle aircraft involves predicting future positions for up to a pre-determined traffic predictive distance. Determining whether the predicted future positions of the ownship aircraft and obstacle aircraft overlap in the future involves assessing whether there is a risk that the Aircraft Protection Zone for the ownship at predicted positions up to the look-ahead prediction distance would intersect with the Aircraft Protection Zone of the target aircraft at predicted positions up to the traffic predictive distance.

The predicted positions for the ownship aircraft are determined based on the most recent measured ownship aircraft position. When the measured ownship aircraft position can be projected to a point on a guidance line, the processor will predict the position of the ownship aircraft forward along the guidance line of the taxiway based on the current ground speed of the ownship aircraft. When the measured ownship aircraft position is not projected onto a point on the guidance line (e.g., when the measured position is greater than the threshold distance away from the guidance line), the processor will predict the position of the ownship aircraft forward based on the current aircraft true heading and ground speed.

Similarly, the predicted positions for the traffic aircraft are determined based on the most recent measured traffic aircraft position. When the measured traffic aircraft position can be projected to a point on a guidance line, the ownship aircraft will predict the position of the traffic aircraft forward along the guidance line of the taxiway based on the current ground speed of the target aircraft. When the measured target aircraft position is not projected onto a point on the guidance line (e.g., the measured position is greater than the threshold distance away from the guidance line), the ownship aircraft will predict the position of the traffic aircraft forward based on the current target aircraft true heading and ground speed.

The ownship aircraft look-ahead prediction distance is set to a distance that would allow the ownship aircraft to fully stop within the look-ahead predictive distance if a potential collision is detected. The predictive distance for the ownship aircraft is a function of pilot reaction time and braking distance. In this example, the pilot reaction time is set as a predefined constant value (e.g., 2 seconds). An example computation for the look-ahead predictive distance is as follows: Distance=<Pilot Reaction Time>*<Ground Speed>+Braking Distance.

The traffic predictive distance is set to a distance that allows the ownship aircraft to fully stop to avoid a collision if a collision risk is detected with the target aircraft. Based on the assumption that actions of the traffic aircraft are out of the control of the flight crew on the ownship aircraft, it is assumed that the traffic aircraft would continue to move forward at its current ground speed even when a potential collision risk is detected by the ownship aircraft. To guard against collision, a traffic predictive distance can be computed as follow: Traffic Predictive Distance=<Ownship Stop Time>*<Traffic Ground Speed>.

Figure 9:
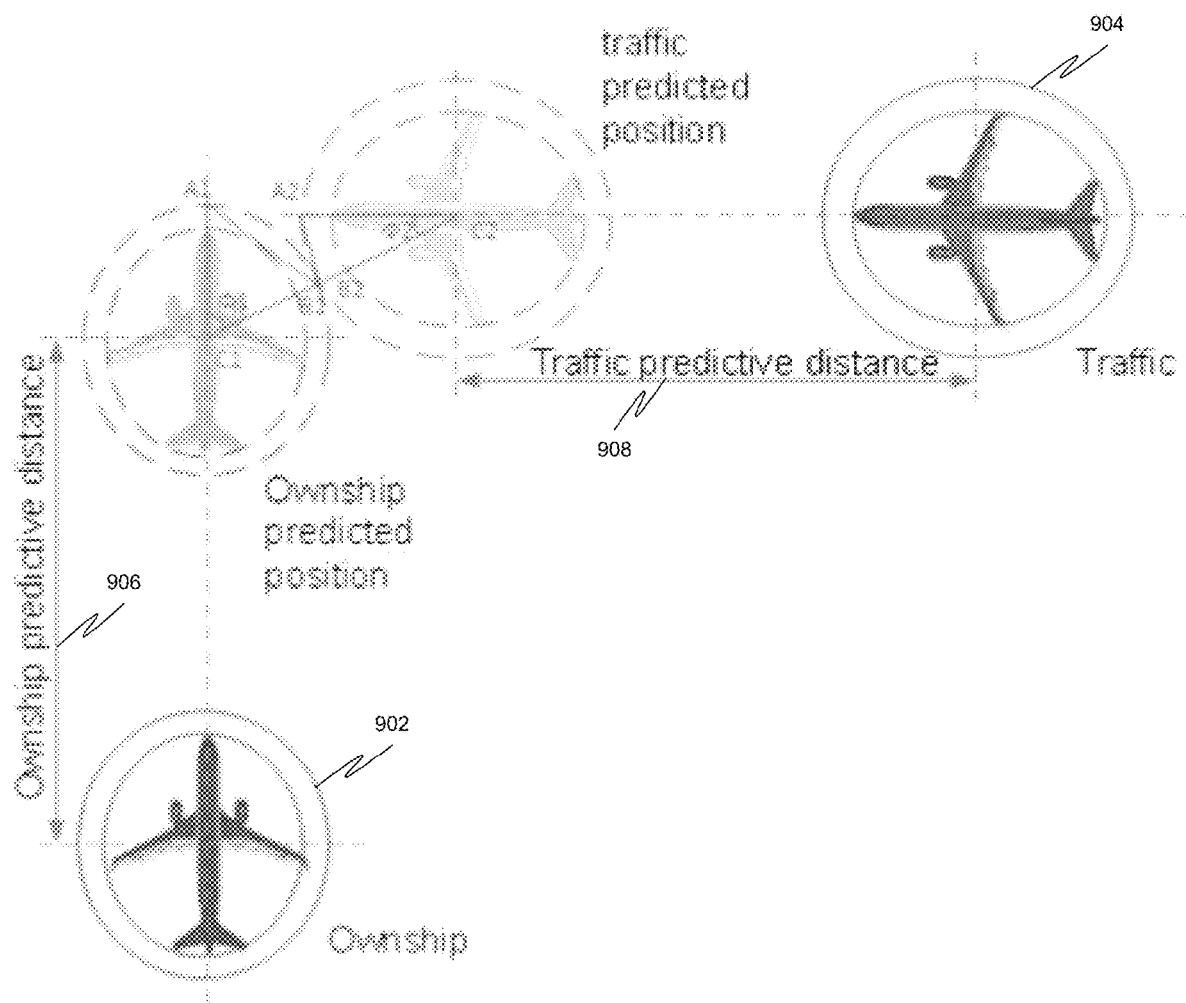
FIG. 9 is a diagram depicting example predicted future positions for an ownship aircraft and example predicted future positions for a traffic aircraft from which collision risk assessment may be performed, in accordance with some embodiments.

FIG. 9 is a diagram depicting example predicted future positions for an ownship aircraft and example predicted future positions for a traffic aircraft from which collision risk assessment may be performed. The processor is configured to assess whether the ownship aircraft predictive envelope 902 overlaps with the traffic aircraft predictive envelope 904. When it is predicted that the two envelopes 902, 904 will overlap, as illustrated, the processor will generate a collision alert. Predicting whether the ownship aircraft predictive envelope 902 will overlap with the traffic aircraft predictive envelope 904 involves predicting future positions for the ownship aircraft predictive envelope 902 up to a look-ahead prediction distance 906 and predicting future positions of the traffic aircraft predictive envelope 904 up to a traffic predictive distance 908.

In the example of FIG. 9, if C1C2<=C1B1+C2B2, the collision avoidance system will generate an alert. The C1C2 is the distance between the ownship aircraft predicted position and the traffic predicted position, $\Phi 1$ and $\Phi 2$ can be computed based on aircraft moving direction and predicted position, thus distance C1B1 and C2B2 can be computed based on $\Phi 1$, $\Phi 2$ and the axis length of the aircraft protection zone. If a predicted collision area is located outside of any taxiway, runway or apron area, the collision risk may be considered as a nuisance alert and ignored.

Figure 10:
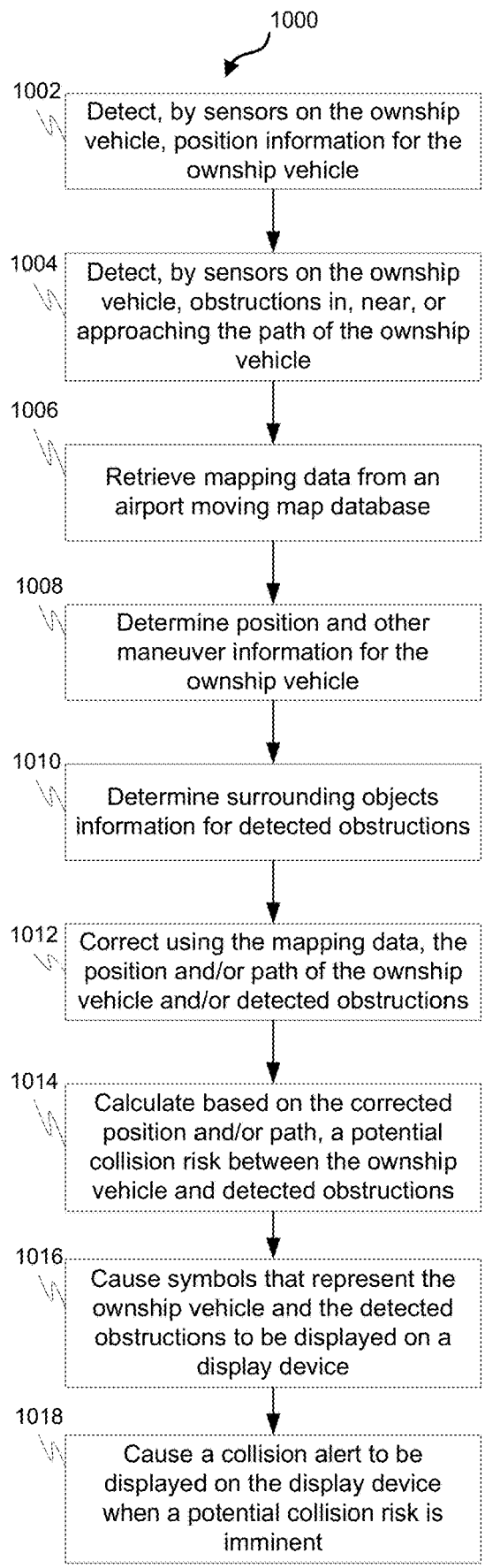
FIG. 10 is a process flow chart depicting an example processor-implemented collision avoidance process in an ownship vehicle, in accordance with some embodiments.

FIG. 10 is a process flow chart depicting a processor-implemented collision avoidance process 1000 in an ownship vehicle. The order of operation within the process 1000 is not limited to the sequential execution as illustrated in the figure, but may be performed in one or more varying orders as applicable and in accordance with the present disclosure.

The example process 1000 includes detecting, by sensors on the ownship vehicle, position information for the ownship vehicle (operation 1002) including latitude, longitude, altitude, ground speed and heading.

The example process 1000 includes detecting, by sensors on the ownship vehicle, any obstruction (including any dynamic obstacle such as other ground vehicle or other aircraft, and any fixed obstacle such as buildings, poles, etc.) in, near, or approaching the path of the ownship vehicle and the position, size, ground speed and heading of the obstruction (operation 1004).

The example process 1000 includes retrieving, by a processor on the ownship vehicle, mapping data from an airport moving map database which includes coordinates of airport elements that includes runways, taxiways, and terminal buildings (operation 1006).

The example process 1000 includes determining, by the processor, position and other maneuver information for the ownship vehicle including ground speed and heading information (operation 1008).

The example process 1000 includes determining, by the processor, surrounding objects information for detected obstructions including position, velocity, heading, and size of detected obstructions (operation 1010).

The example process 1000 includes correcting, by the processor, using the mapping data from the airport moving map database and/or historical mapping data derived from a statistical model, the position and/or path of the ownship vehicle and/or detected obstructions (operation 1012).

The example process 1000 includes calculating, by the processor, based on the corrected position and/or path, a potential collision risk between the ownship vehicle and detected obstructions (operation 1014), including using the mapping data from the airport moving map database and/or historical mapping data derived from the statistical model to filter out a nuisance alert of a potential collision that cannot occur because of travel path constraints imposed by runways, taxiways, and/or other airport surface operation rules on the ownship vehicle and/or detected obstructions.

The example process 1000 includes causing, by the processor, symbols that represent the ownship vehicle and the detected obstructions to be displayed on a display device along with associated position, ground speed, and heading for the objects (operation 1016).

The example process 1000 includes causing, by the processor, a collision alert to be displayed on the display device when a potential collision risk between the ownship vehicle and a detected obstruction is imminent (operation 1018).

Figure 11:
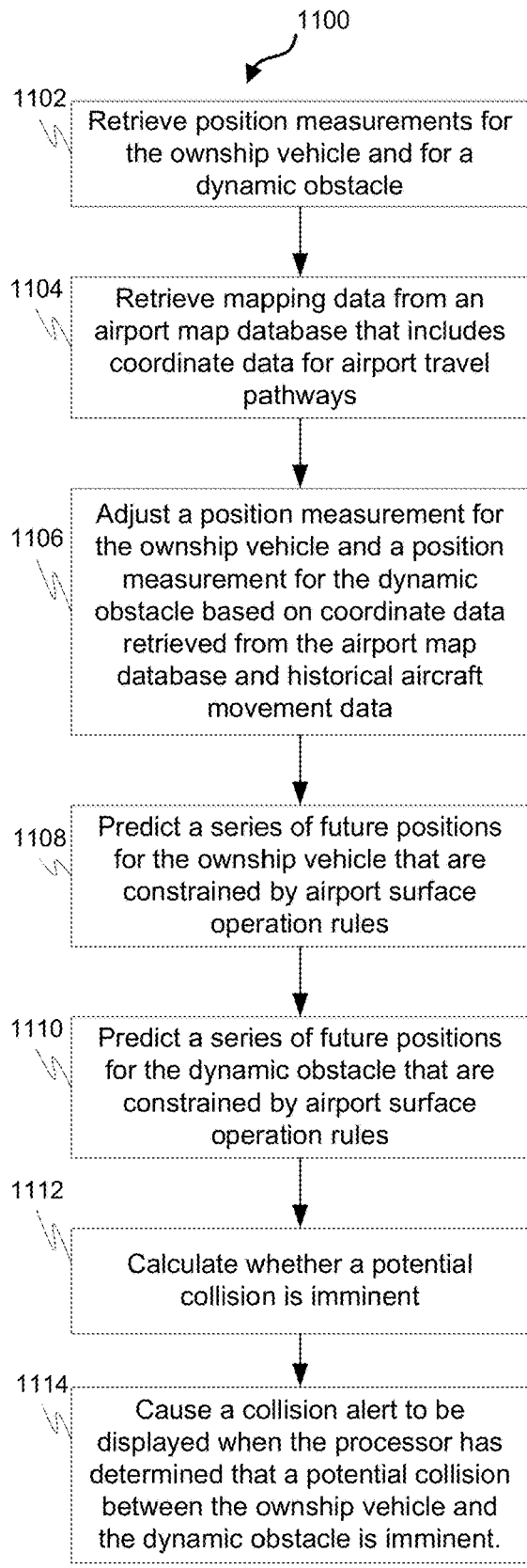
FIG. 11 is a process flow chart depicting another processor-implemented collision avoidance process in an ownship vehicle, in accordance with some embodiments.

FIG. 11 is a process flow chart depicting another processor-implemented collision avoidance process 1100 in an ownship vehicle. The order of operation within the process 1100 is not limited to the sequential execution as illustrated in the figure, but may be performed in one or more varying orders as applicable and in accordance with the present disclosure.

The example process 1100 includes retrieving position measurements for the ownship vehicle and for a dynamic obstacle (operation 1102). This may involve retrieving, from sensors on the ownship vehicle, position measurements for the ownship vehicle on the ground and for a dynamic obstacle on the ground.

The example process 1100 includes retrieving mapping data from an airport map database that includes coordinate data for airport travel pathways (operation 1104). This involves retrieving, by a processor on the ownship vehicle, mapping data from an airport map database that includes coordinate data for airport travel pathways.

The example process 1100 includes adjusting a position measurement for the ownship vehicle and a position measurement for the dynamic obstacle based on coordinate data retrieved from the airport map database and historical aircraft movement data (operation 1106). This may involve adjusting, by the processor, a position measurement for the ownship vehicle to a current ownship vehicle position based on coordinate data retrieved from the airport map database and historical aircraft movement data and adjusting, by the processor, a position measurement for the dynamic obstacle to a current dynamic obstacle position based on coordinate data retrieved from the airport map database and historical aircraft movement data.

The example process 1100 includes predicting a series of future positions for the ownship vehicle that are constrained by airport surface operation rules (operation 1108). This may involve predicting, by the processor, a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data.

The example process 1100 includes predicting a series of future positions for the dynamic obstacle that are constrained by airport surface operation rules (operation 1110). This may involve predicting, by the processor, a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data.

The example process 1100 includes calculating whether a potential collision is imminent (operation 1112). This may involve calculating, by the processor, whether a potential collision is imminent by estimating whether the predicted series of future positions for the ownship vehicle will intersect with the predicted series of future positions for the dynamic obstacle.

The example process 1100 includes causing a collision alert to be displayed when the processor has determined that a potential collision between the ownship vehicle and the dynamic obstacle is imminent (operation 1114). This may involve causing, by the processor, a collision alert to be displayed on a display device when the processor has determined that a potential collision between the ownship vehicle and the dynamic obstacle is imminent.

Described herein are apparatus, systems, techniques and articles for an aircraft ground collision avoidance system. The apparatus, systems, techniques and articles provided herein can make use of an airport moving map database to correct aircraft and object position and/or path for predicting possible alert situations. The apparatus, systems, techniques and articles provided herein can make use of an airport moving map database to identify a potential nuisance alert event based on surface operation rules and airport geometry, so that, for example, two aircraft moving on two independent taxiways do not lead to an alert condition.

In one embodiment, a processor-implemented ground collision avoidance method in an ownship vehicle is provided. The method comprises: retrieving, from sensors on the ownship vehicle, position measurements for the ownship vehicle on the ground and for a dynamic obstacle on the ground; retrieving, by a processor on the ownship vehicle, mapping data from an airport map database that includes coordinate data for airport travel pathways and coordinate data and dimension data for any static obstruction (e.g., building, pole, etc.) on an airport surface; adjusting, by the processor, a position measurement for the ownship vehicle to a current ownship vehicle position based on coordinate data retrieved from the airport map database and historical aircraft movement data; adjusting, by the processor, a position measurement for the dynamic obstacle to a current dynamic obstacle position based on coordinate data retrieved from the airport map database and historical aircraft movement data; predicting, by the processor, a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data; predicting, by the processor, a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data; calculating, by the processor, whether a potential collision is imminent by estimating whether the predicted series of future positions for the ownship vehicle will intersect with the predicted series of future positions for the dynamic obstacle; calculating, by the processor, whether a potential collision is imminent by estimating whether the predicted series of future positions for the ownship vehicle will intersect with the boundary of a static obstruction; and causing, by the processor, a collision alert to be displayed on a display device when the processor has determined that a potential collision between the ownship vehicle and the dynamic obstacle or static obstacle is imminent.

These aspects and other embodiments may include one or more of the following features. The adjusting a position measurement for the ownship vehicle to a current ownship vehicle position based on coordinate data retrieved from the airport map database and historical aircraft movement data may comprise: estimating a current position for the ownship vehicle by adjusting a position measurement for the ownship vehicle to the nearest coordinate on a guidance line for an airport travel pathway and choosing the nearest coordinate as the current position when the nearest coordinate is less than or equal to a threshold distance away from the position measurement and choosing the position measurement as the current position when the nearest coordinate is greater than a threshold distance away from the position measurement. The adjusting a position measurement for the dynamic obstacle to a current dynamic obstacle position based on coordinate data retrieved from the airport map database and historical aircraft movement data may comprise: estimating a current position for the dynamic obstacle by adjusting a position measurement for the dynamic obstacle to the nearest coordinate on a guidance line for an airport travel pathway and choosing the nearest coordinate as the current position when the nearest coordinate is less than or equal to a threshold distance away from the position measurement and choosing the position measurement as the current position when the nearest coordinate is greater than a threshold distance away from the position measurement. The threshold distance may have been determined based on historical aircraft movement data. The threshold distance may have been determined based on statistics relating to historical taxi operation data on an airport surface. The threshold distance may be configurable for different airport surfaces, and the processor may select a corresponding threshold value for use based on a measured aircraft position. The coordinate data retrieved from the airport map database may comprise coordinate data for a guidance line for an airport travel pathway. The predicting a series of future positions for the ownship vehicle may comprise predicting a series of future positions for the ownship vehicle by estimating a next future position using a previous estimated position, velocity, and heading of the ownship vehicle, adjusting the estimated next future position to the nearest coordinate on the guidance line and choosing the nearest coordinate as a predicted next future position for the ownship vehicle when the nearest coordinate is less than or equal to the threshold distance away from the estimated next future position and choosing the estimated next future position as the estimated next future position for the ownship vehicle when the nearest coordinate is greater than a threshold distance away from the estimated next future position. The predicting a series of future positions for the dynamic obstacle may comprise predicting a series of future positions for the dynamic obstacle by estimating a next future position using a previous estimated position, velocity, and heading of the dynamic obstacle, adjusting the estimated next future position to the nearest coordinate on the guidance line and choosing the nearest coordinate as a predicted next future position for the dynamic obstacle when the nearest coordinate is less than or equal to the threshold distance away from the estimated next future position and choosing the estimated next future position as the estimated next future position for the dynamic obstacle when the nearest coordinate is greater than a threshold distance away from the estimated next future position. The calculating whether a potential collision is imminent may comprise filtering out a nuisance alert of a potential collision that cannot occur because of travel path constraints imposed by airport surface operation rules on the ownship vehicle and/or the dynamic obstacle. The collision avoidance method may further comprise causing, by the processor, symbols that represent the ownship vehicle and the dynamic obstacle to be displayed on the display device along with associated position, ground speed, and heading information for the ownship vehicle and the dynamic obstacle. The airport travel pathways may comprise a runway, a taxiway, and/or a taxi line in a ramp area or apron. The method may further comprise generating an aircraft protection zone around the current ownship vehicle position and the current dynamic obstacle position, and wherein: the predicting a series of future positions for the ownship vehicle may comprise predicting a series of future positions for the aircraft protection zone around the current ownship vehicle position and predicted future ownship vehicle positions; and the predicting a series of future positions for the dynamic obstacle may comprise predicting a series of future positions for the aircraft protection zone around the current dynamic obstacle position and predicted future dynamic obstacle positions. The dynamic obstacle may comprise a ground vehicle or another aircraft.

In another embodiment, a ground collision avoidance system in an ownship vehicle is provided. The system comprises a controller configured by programming instructions encoded on non-transitory computer readable media. The controller is configured to: retrieve, from sensors on the ownship vehicle, position measurements for the ownship vehicle on the ground and for a dynamic obstacle on the ground; retrieve mapping data from an airport map database that includes coordinate data for airport travel pathways and coordinate data and dimension data for a static obstruction on an airport surface; adjust a position measurement for the ownship vehicle to a current ownship vehicle position based on coordinate data retrieved from the airport map database and historical aircraft movement data; adjust a position measurement for the dynamic obstacle to a current dynamic obstacle position based on coordinate data retrieved from the airport map database and historical aircraft movement data; predict a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data; predict a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data; calculate whether a potential collision is imminent by estimating whether the predicted series of future positions for the ownship vehicle will intersect with the predicted series of future positions for the dynamic obstacle; calculate whether a potential collision is imminent by estimating whether the predicted series of future positions for the ownship vehicle will intersect with the boundary of a static obstruction; and cause a collision alert to be displayed on a display device when the processor has determined that a potential collision between the ownship vehicle and the dynamic obstacle or static obstacle is imminent.

These aspects and other embodiments may include one or more of the following features. To adjust a position measurement for the ownship vehicle to a current ownship vehicle position based on coordinate data retrieved from the airport map database and historical aircraft movement data the controller may be configured to: estimate a current position for the ownship vehicle by adjusting a position measurement for the ownship vehicle to the nearest coordinate on a guidance line for an airport travel pathway and choosing the nearest coordinate as the current position when the nearest coordinate may be less than or equal to a threshold distance away from the position measurement and choosing the position measurement as the current position when the nearest coordinate may be greater than a threshold distance away from the position measurement. To adjust a position measurement for the dynamic obstacle to a current dynamic obstacle position based on coordinate data retrieved from the airport map database and historical aircraft movement data the controller may be configured to: estimate a current position for the dynamic obstacle by adjusting a position measurement for the dynamic obstacle to the nearest coordinate on a guidance line for an airport travel pathway and choosing the nearest coordinate as the current position when the nearest coordinate may be less than or equal to a threshold distance away from the position measurement and choosing the position measurement as the current position when the nearest coordinate may be greater than a threshold distance away from the position measurement. To predict a series of future positions for the ownship vehicle the controller may be configured to predict a series of future positions for the ownship vehicle by estimating a next future position using a previous estimated position, velocity, and heading of the ownship vehicle, adjusting the estimated next future position to the nearest coordinate on the guidance line and choosing the nearest coordinate as a predicted next future position for the ownship vehicle when the nearest coordinate may be less than or equal to the threshold distance away from the estimated next future position and choosing the estimated next future position as the estimated next future position for the ownship vehicle when the nearest coordinate may be greater than a threshold distance away from the estimated next future position. To predict a series of future positions for the dynamic obstacle the controller may be configured to predict a series of future positions for the dynamic obstacle by estimating a next future position using a previous estimated position, velocity, and heading of the dynamic obstacle, adjusting the estimated next future position to the nearest coordinate on the guidance line and choosing the nearest coordinate as a predicted next future position for the dynamic obstacle when the nearest coordinate may be less than or equal to the threshold distance away from the estimated next future position and choosing the estimated next future position as the estimated next future position for the dynamic obstacle when the nearest coordinate may be greater than a threshold distance away from the estimated next future position. To calculate whether a potential collision may be imminent the controller may be configured to filter out a nuisance alert of a potential collision that cannot occur because of travel path constraints imposed by airport surface operation rules on the ownship vehicle and/or the dynamic obstacle. The controller may be further configured to generate an aircraft protection zone around the current ownship vehicle position and the current dynamic obstacle position, and wherein: to predict a series of future positions for the ownship vehicle the controller may be configured to predict a series of future positions for the aircraft protection zone around the current ownship vehicle position and predicted future ownship vehicle positions; and to predict a series of future positions for the dynamic obstacle the controller may be configured to predict a series of future positions for the aircraft protection zone around the current dynamic obstacle position and predicted future dynamic obstacle positions. The threshold distance may have been determined based on historical aircraft movement data. The threshold distance may have been determined based on statistics relating to historical taxi operation data on an airport surface. The threshold distance may be configurable for different airport surfaces, and the processor may select a corresponding threshold value for use based on a measured aircraft position. The coordinate data retrieved from the airport map database may comprise coordinate data for a guidance line for an airport travel pathway. The airport travel pathways may comprise a runway, a taxiway, and/or a taxi line in a ramp area or apron. The dynamic obstacle may comprise a ground vehicle or another aircraft.

In another embodiment, non-transitory computer readable media encoded with programming instructions configurable to cause a processor to perform a method is provided. The method comprises: retrieving, from sensors on the ownship vehicle, position measurements for the ownship vehicle on the ground and for a dynamic obstacle on the ground; retrieving, by a processor on the ownship vehicle, mapping data from an airport map database that includes coordinate data for airport travel pathways and coordinate data and dimension data for a static obstruction on an airport surface; adjusting, by the processor, a position measurement for the ownship vehicle to a current ownship vehicle position based on coordinate data retrieved from the airport map database and historical aircraft movement data; adjusting, by the processor, a position measurement for the dynamic obstacle to a current dynamic obstacle position based on coordinate data retrieved from the airport map database and historical aircraft movement data; predicting, by the processor, a series of future positions for the ownship vehicle that are constrained by airport surface operation rules by estimating a next future position for the ownship vehicle using a previous estimated position, velocity, and heading of the ownship vehicle and adjusting the estimated next future position to a predicted next future position for the ownship vehicle based on coordinate data retrieved from the airport map database and historical aircraft movement data; predicting, by the processor, a series of future positions for the dynamic obstacle that are constrained by airport surface operation rules by estimating a next future position for the dynamic obstacle using a previous estimated position, velocity, and heading of the dynamic obstacle and adjusting the estimated next future position to a predicted next future position for the dynamic obstacle based on coordinate data retrieved from the airport map database and historical aircraft movement data; calculating, by the processor, whether a potential collision is imminent by estimating whether the predicted series of future positions for the ownship vehicle will intersect with the predicted series of future positions for the dynamic obstacle; calculating, by the processor, whether a potential collision is imminent by estimating whether the predicted series of future positions for the ownship vehicle will intersect with the boundary of a static obstruction; and causing, by the processor, a collision alert to be displayed on a display device when the processor has determined that a potential collision between the ownship vehicle and the dynamic obstacle or static obstacle is imminent.

These aspects and other embodiments may include one or more of the following features. The adjusting a position measurement for the ownship vehicle to a current ownship vehicle position based on coordinate data retrieved from the airport map database and historical aircraft movement data may comprise: estimating a current position for the ownship vehicle by adjusting a position measurement for the ownship vehicle to the nearest coordinate on a guidance line for an airport travel pathway and choosing the nearest coordinate as the current position when the nearest coordinate is less than or equal to a threshold distance away from the position measurement and choosing the position measurement as the current position when the nearest coordinate is greater than a threshold distance away from the position measurement. The adjusting a position measurement for the dynamic obstacle to a current dynamic obstacle position based on coordinate data retrieved from the airport map database and historical aircraft movement data may comprise: estimating a current position for the dynamic obstacle by adjusting a position measurement for the dynamic obstacle to the nearest coordinate on a guidance line for an airport travel pathway and choosing the nearest coordinate as the current position when the nearest coordinate is less than or equal to a threshold distance away from the position measurement and choosing the position measurement as the current position when the nearest coordinate is greater than a threshold distance away from the position measurement. The threshold distance may have been determined based on historical aircraft movement data. The threshold distance may have been determined based on statistics relating to historical taxi operation data on an airport surface. The threshold distance may be configurable for different airport surfaces, and the processor may select a corresponding threshold value for use based on a measured aircraft position. The coordinate data retrieved from the airport map database may comprise coordinate data for a guidance line for an airport travel pathway. The predicting a series of future positions for the ownship vehicle may comprise predicting a series of future positions for the ownship vehicle by estimating a next future position using a previous estimated position, velocity, and heading of the ownship vehicle, adjusting the estimated next future position to the nearest coordinate on the guidance line and choosing the nearest coordinate as a predicted next future position for the ownship vehicle when the nearest coordinate is less than or equal to the threshold distance away from the estimated next future position and choosing the estimated next future position as the estimated next future position for the ownship vehicle when the nearest coordinate is greater than a threshold distance away from the estimated next future position. The predicting a series of future positions for the dynamic obstacle may comprise predicting a series of future positions for the dynamic obstacle by estimating a next future position using a previous estimated position, velocity, and heading of the dynamic obstacle, adjusting the estimated next future position to the nearest coordinate on the guidance line and choosing the nearest coordinate as a predicted next future position for the dynamic obstacle when the nearest coordinate is less than or equal to the threshold distance away from the estimated next future position and choosing the estimated next future position as the estimated next future position for the dynamic obstacle when the nearest coordinate is greater than a threshold distance away from the estimated next future position. The calculating whether a potential collision is imminent may comprise filtering out a nuisance alert of a potential collision that cannot occur because of travel path constraints imposed by airport surface operation rules on the ownship vehicle and/or the dynamic obstacle. The collision avoidance method may further comprise causing, by the processor, symbols that represent the ownship vehicle and the dynamic obstacle to be displayed on the display device along with associated position, ground speed, and heading information for the ownship vehicle and the dynamic obstacle. The airport travel pathways may comprise a runway, a taxiway, and/or a taxi line in a ramp area or apron. The method may further comprise generating an aircraft protection zone around the current ownship vehicle position and the current dynamic obstacle position, and wherein: the predicting a series of future positions for the ownship vehicle may comprise predicting a series of future positions for the aircraft protection zone around the current ownship vehicle position and predicted future ownship vehicle positions; and the predicting a series of future positions for the dynamic obstacle may comprise predicting a series of future positions for the aircraft protection zone around the current dynamic obstacle position and predicted future dynamic obstacle positions. The dynamic obstacle may comprise a ground vehicle or another aircraft.

In another embodiment, a processor-implemented collision avoidance method in an ownship vehicle is provided. The method comprises: detecting, by sensors on the ownship vehicle, position information for the ownship vehicle including latitude, longitude, altitude, ground speed and heading; detecting, by sensors on the ownship vehicle, any dynamic obstacle including a ground vehicle or other aircraft, and any fixed obstacle including a building or poles in, near, or approaching the path of the ownship vehicle and the position, size, ground speed and heading of any dynamic obstacle; retrieving, by a processor on the ownship vehicle, mapping data from an airport moving map database which includes coordinates of airport elements that includes runways, taxiways, and terminal buildings; determining, by the processor, position and other maneuver information for the ownship vehicle including ground speed and heading information; determining, by the processor, surrounding objects information for a detected dynamic obstacle including position, velocity, heading, and size of the detected dynamic obstacle; correcting, by the processor, using the mapping data from the airport moving map database and/or historical mapping data derived from a statistical model, the position and/or path of the ownship vehicle and/or detected obstructions; calculating, by the processor, based on the corrected position and/or path, a potential collision risk between the ownship vehicle and detected obstructions, including using the mapping data from the airport moving map database and/or historical mapping data derived from the statistical model to filter out a nuisance alert of a potential collision that cannot occur because of travel path constraints imposed by runways, taxiways, and/or other airport surface operation rules on the ownship vehicle and/or detected obstructions; causing, by the processor, symbols that represent the ownship vehicle and the detected obstructions to be displayed on a display device along with associated position, ground speed, and heading for the objects; and causing, by the processor, a collision alert to be displayed on the display device when a potential collision risk between the ownship vehicle and a detected obstruction is imminent.

In another embodiment, a collision avoidance system in an ownship vehicle is provided. The system comprises a controller configured by programming instructions encoded on non-transitory computer readable media. The controller is configured to: retrieve position information for the ownship vehicle including latitude, longitude, altitude, ground speed and heading detected by sensors on the ownship vehicle; detect, using sensors on the ownship vehicle, any dynamic obstacle including a ground vehicle or other aircraft, and any fixed obstacle including a building or poles in, near, or approaching the path of the ownship vehicle and the position, size, ground speed and heading of any dynamic obstacle; retrieve mapping data from an airport moving map database which includes coordinates of airport elements that includes runways, taxiways, and terminal buildings; determine position and other maneuver information for the ownship vehicle including ground speed and heading information; determine surrounding objects information for a detected dynamic obstacle including position, velocity, heading, and size of the detected dynamic obstacle; correct using the mapping data from the airport moving map database and/or historical mapping data derived from a statistical model, the position and/or path of the ownship vehicle and/or detected obstructions; calculate based on the corrected position and/or path, a potential collision risk between the ownship vehicle and detected obstructions, including using the mapping data from the airport moving map database and/or historical mapping data derived from the statistical model to filter out a nuisance alert of a potential collision that cannot occur because of travel path constraints imposed by runways, taxiways, and/or other airport surface operation rules on the ownship vehicle and/or detected obstructions; cause symbols that represent the ownship vehicle and the detected obstructions to be displayed on a display device along with associated position, ground speed, and heading for the ownship vehicle and the detected obstructions; and cause a collision alert to be displayed on the display device when a potential collision risk between the ownship vehicle and a detected obstruction is imminent.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A ground collision avoidance method in an ownship vehicle, the method comprising:
    sensing, using aircraft sensors, aircraft position measurements for the ownship vehicle on the ground and dynamic obstacle position measurements for a dynamic obstacle on the ground;
    retrieving mapping data from an airport map database that includes coordinate data for airport travel pathways, coordinate data for guidance lines on airport travel pathways, and coordinate data and dimension data for a static obstruction on an airport surface;
    adjusting an aircraft position measurement to a nearest point on a first guidance line on an airport travel pathway on which the ownship vehicle is traveling when the difference between the aircraft position measurement and the nearest point on the first guidance line is less than a first threshold distance;
    adjusting a dynamic obstacle position measurement to a nearest point on a second guidance line on an airport travel pathway on which the dynamic obstacle is traveling when the difference between the dynamic obstacle position measurement and the nearest point on the second guidance line is less than a second threshold distance;
    predicting a series of future positions for the ownship vehicle that are constrained by airport surface operation rules by:
        estimating a next future position for the ownship vehicle based on a previous estimated position, velocity, and heading of the ownship vehicle, and
        adjusting the estimated next future position to a nearest coordinate on the first guidance line when the nearest coordinate is less than the first threshold distance away from the estimated next future position;
    predicting a series of future positions for the dynamic obstacle that are constrained by airport surface operation rules by:
        estimating a next future position for the dynamic obstacle based on a previous estimated position, velocity, and heading of the dynamic obstacle and
        adjusting the estimated next future position to a nearest coordinate on the second guidance line when the nearest coordinate is less than the second threshold distance away from the estimated next future position;
    calculating whether a potential collision may occur by estimating whether the predicted series of future positions for the ownship vehicle will intersect with the predicted series of future positions for the dynamic obstacle;
    calculating whether a potential collision may occur by estimating whether the predicted series of future positions for the ownship vehicle will intersect with a boundary of a static obstruction; and
    visually displaying a collision alert on a display device in the ownship vehicle when it is determined that a potential collision between the ownship vehicle and the dynamic obstacle or static obstacle may occur.

2. The ground collision avoidance method of claim 1, wherein the first or second threshold distance was determined based on historical aircraft movement data.

3. The ground collision avoidance method of claim 1, wherein the first or second threshold distance was determined based on statistics relating to historical taxi operation data on an airport surface.

4. The ground collision avoidance method of claim 1, wherein the first or second threshold distance is configurable for different airport surfaces, and a corresponding threshold value is selected for use based on a measured aircraft position.

5. The ground collision avoidance method of claim 1, wherein the calculating whether a potential collision may occur comprises filtering out a nuisance alert of a potential collision that cannot occur because of travel path constraints imposed by airport surface operation rules on the ownship vehicle and/or the dynamic obstacle.

6. The ground collision avoidance method of claim 1, further comprising generating an aircraft protection zone around the current ownship vehicle position and a dynamic obstacle protection zone around the current dynamic obstacle position, and wherein:
    the predicting a series of future positions for the ownship vehicle comprises predicting a series of future positions for the aircraft protection zone around the current ownship vehicle position and predicted future ownship vehicle positions; and
    the predicting a series of future positions for the dynamic obstacle comprises predicting a series of future positions for the dynamic obstacle protection zone around the current dynamic obstacle position and predicted future dynamic obstacle positions.

7. The ground collision avoidance method of claim 6, wherein the generating a dynamic obstacle protection zone around the current dynamic obstacle position comprises estimating a traffic aircraft size by tracking all taxiways on which the traffic aircraft has passed, calculating the taxiway width for all tracked taxiways, selecting the minimum value from all calculated taxiway widths, checking the taxiway design criteria for the tracked taxiway with the minimum value to find the taxiway category, identifying the wingspan range for the found taxiway category, estimating the traffic aircraft size based on the maximum value of the identified wingspan range, and generating a dynamic obstacle protection zone that is greater than or equal to the estimated traffic aircraft size.

8. The collision avoidance method of claim 7, wherein estimating whether the predicted series of future positions for the ownship vehicle will intersect with the predicted series of future positions for the dynamic obstacle comprises estimating whether the predicted series of future positions for the aircraft protection zone will intersect with the predicted series of future positions for the dynamic obstacle protection zone.

9. An ownship vehicle comprising:
    a plurality of aircraft sensors configured to sense aircraft position measurements for the ownship vehicle and dynamic obstacle position measurements for a dynamic obstacle on the ground;
    an airport map database that includes mapping data, the mapping data including coordinate data for airport travel pathways, coordinate data for guidance lines on the airport travel pathways, and coordinate data and dimension data for a static obstruction on an airport surface;
    a display device; and
    a controller configured to:
        retrieve, from the aircraft sensors, ownship vehicle position measurements for the ownship vehicle on the ground and dynamic obstacle position measurements for the dynamic obstacle on the ground;

retrieve mapping data from the airport map database;

adjust an aircraft position measurement to a nearest point on a first guidance line on an airport travel pathway on which the ownship vehicle is traveling when the difference between the aircraft position measurement and the nearest point on the first guidance line is less than a first threshold distance;

adjust a dynamic obstacle position measurement to a nearest point on a second guidance line on an airport travel pathway on which the dynamic obstacle is traveling when the difference between the dynamic obstacle position measurement and the nearest point on the second guidance line is less than a second threshold distance;

predict a series of future positions for the ownship vehicle that are constrained by airport surface operation rules by:
  estimating a next future position for the ownship vehicle based on a previous estimated position, velocity, and heading of the ownship vehicle, and
  adjusting the estimated next future position to a nearest coordinate on the first guidance line when the nearest coordinate is less than the first threshold distance away from the estimated next future position;

predict a series of future positions for the dynamic obstacle that are constrained by airport surface operation rules by:
  estimating a next future position for the dynamic obstacle based on a previous estimated position, velocity, and heading of the dynamic obstacle, and
  adjusting the estimated next future position to a nearest coordinate on the second guidance line when the nearest coordinate is less than the second threshold distance away from the estimated next future position;

calculate whether a potential collision may occur by estimating whether the predicted series of future positions for the ownship vehicle will intersect with the predicted series of future positions for the dynamic obstacle;

calculate whether a potential collision may occur by estimating whether the predicted series of future positions for the ownship vehicle will intersect with a boundary of a static obstruction; and cause a collision alert to be displayed on the display device when it is determined that a potential collision between the ownship vehicle and the dynamic obstacle or static obstacle may occur.

10. The ownship vehicle of claim 9, wherein to calculate whether a potential collision may occur the controller is configured to filter out a nuisance alert of a potential collision that cannot occur because of travel path constraints imposed by airport surface operation rules on the ownship vehicle and/or the dynamic obstacle.

11. The ownship vehicle of claim 9, wherein the controller is further configured to generate an aircraft protection zone around the current ownship vehicle position and the current dynamic obstacle position, and wherein:

to predict a series of future positions for the ownship vehicle the controller is configured to predict a series of future positions for the aircraft protection zone around the current ownship vehicle position and predicted future ownship vehicle positions; and to predict a series of future positions for the dynamic obstacle the controller is configured to predict a series of future positions for the aircraft protection zone around the current dynamic obstacle position and predicted future dynamic obstacle positions.

12. The ownship vehicle of claim 11, wherein to generate a dynamic obstacle protection zone around the current dynamic obstacle position, the controller is configured to estimate a traffic aircraft size by tracking all taxiways on which the traffic aircraft has passed, calculating the taxiway width for all tracked taxiways, select the minimum value from all calculated taxiway widths, check the taxiway design criteria for the tracked taxiway with the minimum value to find the taxiway category, identify the wingspan range for the found taxiway category, estimate the traffic aircraft size based on the maximum value of the identified wingspan range, and generate an aircraft protection zone that is greater than or equal to the estimated traffic aircraft size.

13. The ownship vehicle of claim 12, wherein estimating whether the predicted series of future positions for the ownship vehicle will intersect with the predicted series of future positions for the dynamic obstacle comprises estimating whether the predicted series of future positions for the aircraft protection zone will intersect with the predicted series of future positions for the dynamic obstacle protection zone.

14. The ownship vehicle of claim 9, wherein the first or second threshold distance is determined based on historical aircraft movement data.

15. The ownship vehicle of claim 9, wherein the first or second threshold distance is determined based on statistics relating to historical taxi operation data on an airport surface.

16. The ownship vehicle of claim 9, wherein the first or second threshold distance is configurable for different airport surfaces, and a corresponding threshold value is selected for use based on a measured aircraft position.

17. Non-transitory computer readable media encoded with programming instructions configurable to cause a processor to perform a method, the method comprising:

retrieving, from aircraft sensors, ownship vehicle position measurements for an ownship vehicle on the ground and dynamic obstacle position measurements for a dynamic obstacle on the ground;

retrieving mapping data from an airport map database that includes coordinate data for airport travel pathways, coordinate data for guidance lines on airport travel pathways, and coordinate data and dimension data for a static obstruction on an airport surface;

adjusting an aircraft position measurement for the ownship vehicle to a nearest point on a first guidance line on an airport travel pathway on which the ownship vehicle is traveling when the difference between the aircraft position measurement and the nearest point on the first guidance line is less than a first threshold distance;

adjusting a dynamic obstacle position measurement for the dynamic obstacle to a nearest point on a second guidance line on an airport travel pathway on which the dynamic obstacle is traveling when the difference between the dynamic obstacle position measurement and the nearest point on the second guidance line is less than a second threshold distance;

predicting a series of future positions for the ownship vehicle that are constrained by airport surface operation rules by:

estimating a next future position for the ownship vehicle based on a previous estimated position, velocity, and heading of the ownship vehicle, and adjusting the estimated next future position to a nearest coordinate on the first guidance line when the nearest coordinate is less than the first threshold distance away from the estimated next future position;

predicting a series of future positions for the dynamic obstacle that are constrained by airport surface operation rules by:

estimating a next future position for the dynamic obstacle based on a previous estimated position, velocity, and heading of the dynamic obstacle, and adjusting the estimated next future position to a nearest coordinate on the second guidance line when the nearest coordinate is less than the second threshold distance away from the estimated next future position;

calculating whether a potential collision may occur by estimating whether the predicted series of future positions for the ownship vehicle will intersect with the predicted series of future positions for the dynamic obstacle or will intersect with a boundary of static obstruction; and causing a collision alert to be displayed on a display device in the ownship vehicle when the processor has determined that a potential collision between the ownship vehicle and the dynamic obstacle or static obstacle may occur.

18. The non-transitory computer readable media of claim 17, wherein:

the method further comprises generating an aircraft protection zone around the current ownship vehicle position and the current dynamic obstacle position;

the predicting a series of future positions for the ownship vehicle comprises predicting a series of future positions for the aircraft protection zone around the current ownship vehicle position and predicted future ownship vehicle positions; and the predicting a series of future positions for the dynamic obstacle comprises predicting a series of future positions for the aircraft protection zone around the current dynamic obstacle position and predicted future dynamic obstacle positions.

19. The non-transitory computer readable media of claim 18, wherein generating an aircraft protection zone around the current dynamic obstacle position comprises estimating a traffic aircraft size by tracking all taxiways on which the traffic aircraft has passed, calculating the taxiway width for all tracked taxiways, selecting the minimum value from all calculated taxiway widths, checking the taxiway design criteria for the tracked taxiway with the minimum value to find the taxiway category, identifying the wingspan range for the found taxiway category, estimating the traffic aircraft size based on the maximum value of the identified wingspan range, and generating an aircraft protection zone that is greater than or equal to the estimated traffic aircraft size.

20. The non-transitory computer readable media of claim 19, wherein estimating whether the predicted series of future positions for the ownship vehicle will intersect with the predicted series of future positions for the dynamic obstacle comprises estimating whether the predicted series of future positions for the aircraft protection zone will intersect with the predicted series of future positions for the dynamic obstacle protection zone.

* * * * *